United States Patent
Vyas et al.

(10) Patent No.: US 7,822,043 B2
(45) Date of Patent: Oct. 26, 2010

(54) SUPPORTING APPLICATIONS SENSITIVE TO DATA LOSS ON SWITCHED VIRTUAL CIRCUITS (SVCS)

(75) Inventors: Pankaj Vyas, Bangalore (IN); Rajeev Govindraj Kolla, Bangalore (IN); Ashoka Kallappa, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 11/695,616

(22) Filed: Apr. 3, 2007

(65) Prior Publication Data

US 2007/0183428 A1    Aug. 9, 2007

Related U.S. Application Data

(63) Continuation of application No. 10/126,510, filed on Apr. 22, 2002, now Pat. No. 7,215,674.

(51) Int. Cl.
*H04L 12/28* (2006.01)
(52) U.S. Cl. .................. 370/395.2; 370/397
(58) Field of Classification Search ............... None
See application file for complete search history.

(56) References Cited

U.S. PATENT DOCUMENTS

| 5,903,559 | A | 5/1999 | Acharya et al. |
| 6,044,060 | A | 3/2000 | Jones |
| 6,144,661 | A | 11/2000 | Katsube et al. |
| 6,175,870 | B1 | 1/2001 | Gawlick et al. |
| 6,317,431 | B1 | 11/2001 | Hodgkinson et al. |
| 6,404,737 | B1 | 6/2002 | Novick et al. |
| 6,411,625 | B1 | 6/2002 | Furuhashi et al. |
| 6,490,248 | B1 | 12/2002 | Shimojo |
| 6,597,689 | B1 * | 7/2003 | Chiu et al. .................. 370/354 |
| 6,763,000 | B1 * | 7/2004 | Walsh ........................ 370/252 |
| 6,822,966 | B2 | 11/2004 | Putcha et al. |
| 7,215,674 | B1 * | 5/2007 | Vyas et al. ................ 370/395.2 |
| 2002/0024954 | A1 * | 2/2002 | Cunetto et al. ........... 370/395.2 |
| 2004/0015590 | A1 | 1/2004 | Nagami et al. |
| 2005/0058149 | A1 | 3/2005 | Howe |
| 2008/0089345 | A1 * | 4/2008 | Cunetto et al. ............. 370/396 |

OTHER PUBLICATIONS

The ATM Forum Technical Committee; Entitled:" LAN Emulation over ATM, Version 1.0"; af-lane-0021.000; Jan. 1995; Available from www.atmforum.com; (141Pages).
G. Huston; Entitled: Request for Comments: 2990—Next Steps for the IP QoS Architecture; Nov. 2000; Available from www.ietf.org; (24 Pages).

* cited by examiner

*Primary Examiner*—Jayanti K Patel
*Assistant Examiner*—Anthony Sol
(74) *Attorney, Agent, or Firm*—Patent Capital Group

(57) ABSTRACT

An edge router receives datagrams to be forwarded an SVC. If the SVC is not already set up, the edge router buffers the datagrams until the SVC set up is complete. The buffered datagrams are forwarded once the SVC set up is complete. According to another aspect of the present invention, different buffering requirements are supported for different user applications. A policy table may be configured by a service provider specifying the requirements associated with potentially each flow (e.g., combination of source/destination IP addresses, source/destination port number), and the datagram on each flow may be buffered accordingly.

15 Claims, 4 Drawing Sheets

SUPPORTING APPLICATIONS SENSITIVE TO DATA LOSS ON SWITCHED VIRTUAL CIRCUITS (SVCS)

RELATED APPLICATION

The present application is a continuation of and claims priority from U.S. patent application Ser. No.: 10/126,510 filed on Apr. 22, 2002, naming as inventors Vyas et al, entitled, "Supporting Applications Sensitive to Data Loss on Switched Virtual Circuits (SVCs)" and is incorporated in its entirety into the present application.

BACKGROUND OF THE INVENTION

1. Field of the Invention

The present invention relates to devices such as routers used in telecommunication networks, and more specifically to a method and apparatus for supporting applications sensitive to data loss on switched virtual circuits (SVCs).

2. Related Art

Virtual circuits are often set up to support data transfers on networks. A virtual circuit generally specifies a sequence of switches (in the network) using which a cell would be forwarded when sent from a source switch to a destination switch. Once set up, a first end system (e.g., a server system) may send data to another end system (e.g., a personal computer) using the virtual circuit to support various user applications.

A virtual circuit may be provided in the form of a permanent virtual circuit (PVC). A PVC is generally configured only once by a network administrator, and continues existence even if not in use. As a PVC need not be set up when required, the signaling overhead on a network may be minimized/prevented. However, valuable resources such as buffer space and bandwidth may need to be allocated to each of the PVCs irrespective of whether the PVC is in use or not. As a result, a switch/network may not scale to support many user application.

At least for such reason(s), it may be desirable to support user applications on switched virtual circuits (SVC). As is well known, a SVC is generally set up only when needed and released (terminated) after use. As the resources are not allocated to virtual circuits not in use, the available resources may be used efficiently. Accordingly, it is desirable that the data transfers for applications having different requirements be supported on SVCs.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview And Discussion of the Invention

A switch according to an aspect of the present invention uses a buffer to store data related to applications during the time an SVC is being set up. The buffered data may be transferred on the SVC once the SVC set up is complete. Due to such buffering, data loss may be avoided during the time SVCs are being set up. Accordingly, applications, which are sensitive to data loss, may also be supported by SVCs for transferring data.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
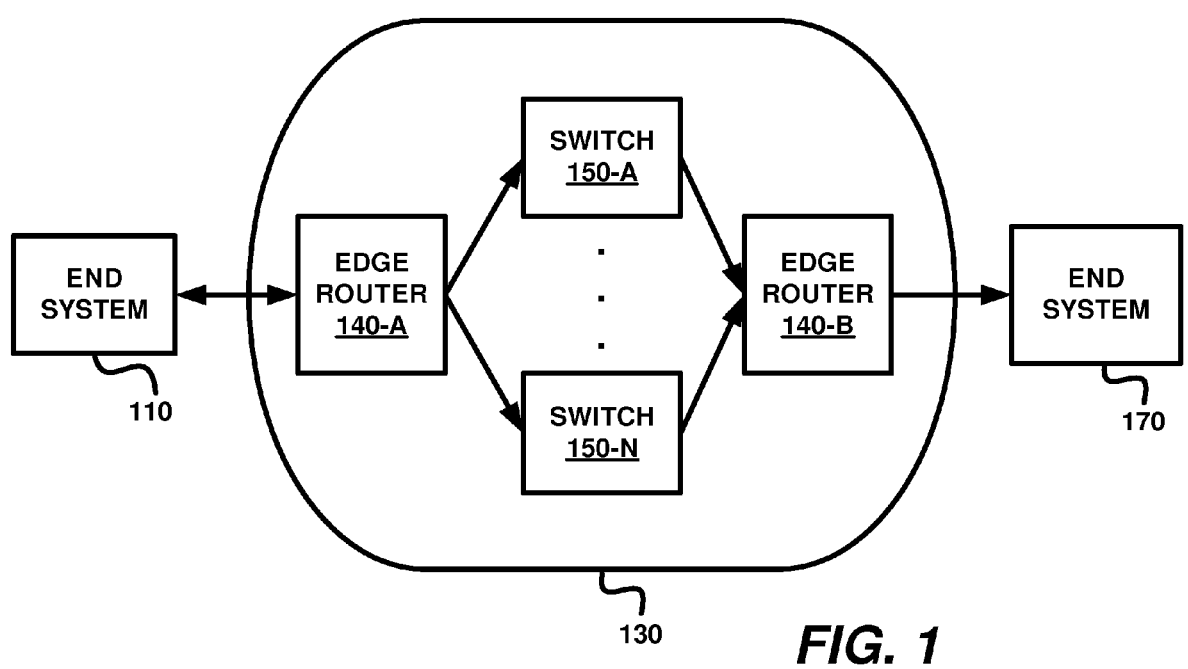
FIG. 1 is a block diagram illustrating an example environment in which the present invention can be implemented.

FIG. 1 is a block diagram illustrating an example environment in which the present invention can be implemented. The environment is shown containing end systems 110 and 170, network 130, edge routers 140-A and 140-B, and switches 150-A through 150-N. Each system is described in further detail below.

End systems 110 and 170 generally represent devices such as computer systems and hand-held systems, which communicate with each other using network 130. Only two end systems are shown in FIG. 1 for conciseness. However, typical environments contain many more end systems. Similarly, network 130 also typically contains many more switches and edge routers than shown.

For illustration it will be assumed that end system 110 sends IP (Internet Protocol) datagrams to edge router 140-A for eventual delivery to end system 170. The manner in which the datagrams are delivered to end system 170 according to various aspects of the present invention is described below.

Edge router 140-A represents a device which receives datagrams from end system 110, and forwards the data on a switched virtual circuit (SVC) to end system 170. The SVC may be set up from edge router 140-A to edge router 140-B using an appropriate signaling protocol. An example signaling protocol (UNI 3.1) is described in a document entitled, "ATM User-Network Interface Specification V3.1" available from www.atmforum.com, and is incorporated in its entirety into the present application. In general, edge routers (140-A and 140-B) and (switches 150-A through 150-N) are implemented to support such signaling protocols, and to forward datagrams on the set up virtual circuits.

However the set up of an SVC may take a certain amount of time. A prior edge router may drop datagrams received until SVC set up is complete. The manner in which edge routers 140-A and 140-B may prevent loss of datagrams when the virtual circuit is being set up is described below with examples.

3. Preventing Data Loss

Figure 2:
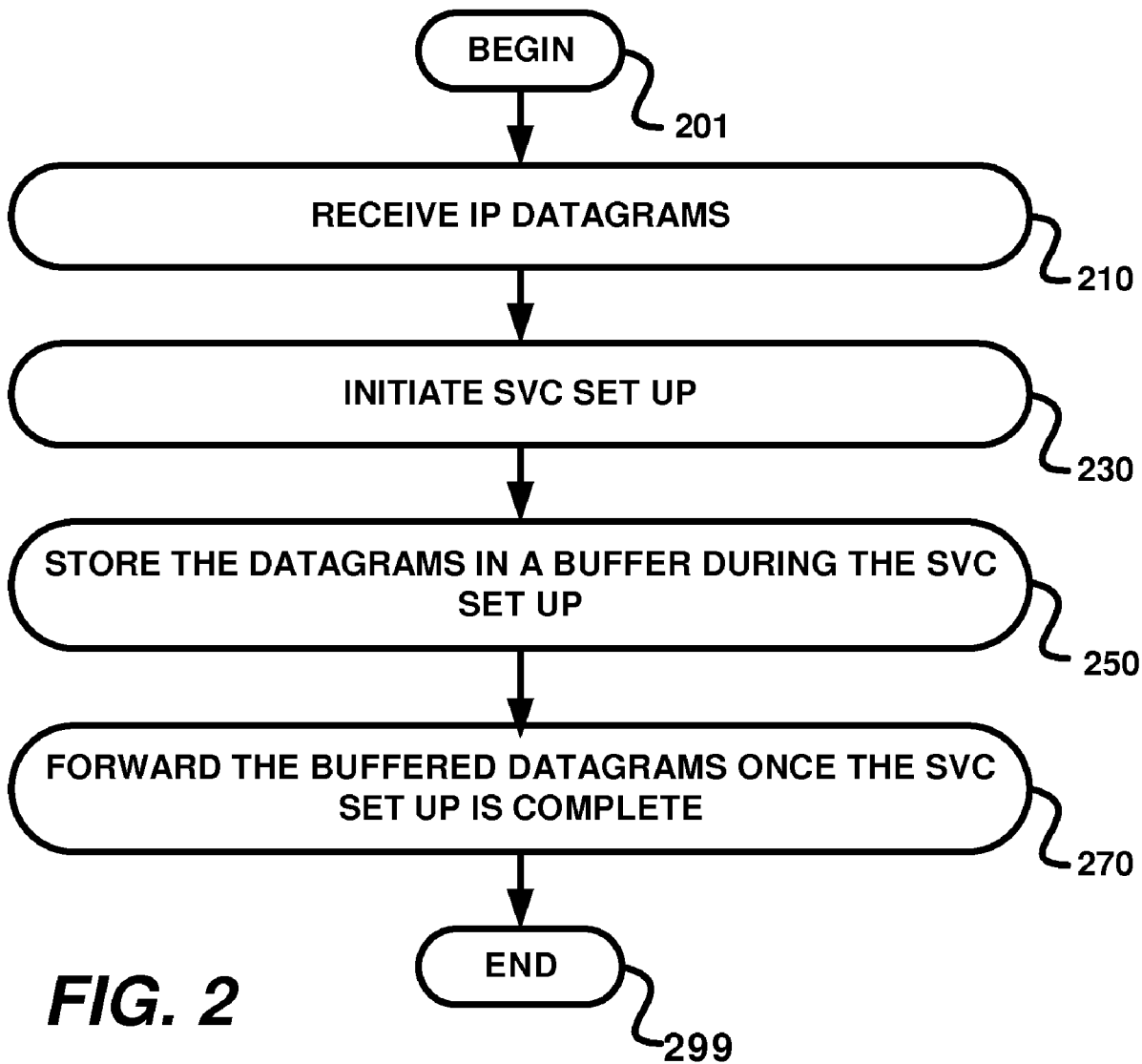
FIG. 2 is a flowchart illustrating a method according to an aspect of the present invention.

FIG. 2 is a flowchart illustrating a method using which data loss may be avoided before set up of a switched virtual circuit (SVC) is complete. The flowchart is described with reference to edge router 140-A of FIG. 1 for illustration. The method can be implemented in other devices as well. The method begins in step 201, in which control immediately passes to step 210.

In step 210, edge router 140-A receives a datagram from end system 110. For illustration, the datagram is assumed to have a destination address of end system 170 connected via edge router 140-B, and that an SVC suitable for transferring the datagram to edge router 140-B is not provisioned in network 130.

In step 230, edge router 140-A initiates SVC set up responsive to receiving the datagram of step 210. The SVC set up may be performed according to any protocol supported by the switches (including edge routers). In step 250, edge router 140-A stores in a buffer the datagrams received prior to completion of the SVC set up. The datagram received in step 210 may also be stored in the buffer. The buffer may be provided internal or external to edge router 140-A.

In step 270, edge router 140-A forwards the buffered datagram along the SVC to edge router 140-B once the set up of the SVC is complete. Thus, a device in accordance with FIG. 2 may prevent/avoid data loss when an SVC is being set up.

However, implementations may need to take into consideration error situations (e.g., SVC set up fails) and/or differing buffering requirements for different applications. An example embodiment which takes some of such considerations into account is described below in further detail.

4. Edge Router

Figure 3:
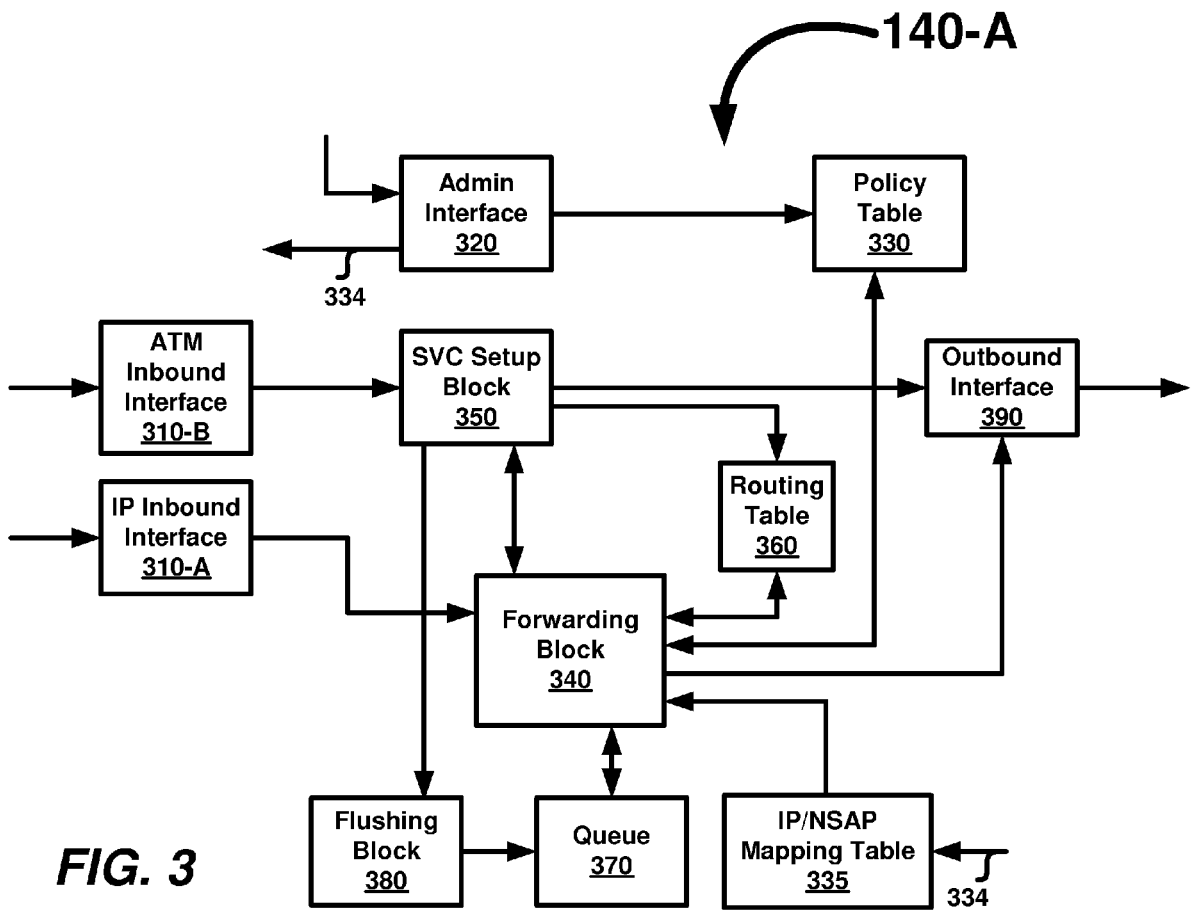
FIG. 3 is a block diagram illustrating the details of implementation of a edge router according to an aspect of the present invention.

FIG. 3 is a block diagram illustrating the details of implementation of edge router 140-A in an embodiment of the present invention. Edge router 140-A is shown containing IP inbound interface 310-A, ATM inbound interface 310-B, administrator (admin) interface block 320, policy table 330, IP/NSAP mapping table 335, forwarding block 340, SVC set up block 350, routing table 360, queue 370, flushing block 380 and outbound interface 390. Only the details of edge router 140-A as necessary for an understanding of the described embodiments are included for conciseness.

IP inbound interface 310-A (IP outbound interface 310-B) provides the physical, electrical and other protocol interfaces to receive (send) IP datagrams from (to) end systems. The received IP datagrams are forwarded to forwarding block 340. Similarly, outbound interface 390 respectively provide the physical, electrical and protocol interfaces to transmit data to the CPEs and switches. Inbound interfaces 310-A and 310-B, and outbound interface 390 may be implemented in a known way.

IP/NSAP mapping table 335 stores a mapping of each IP destination address (of a received datagram) to a network service access point (NSAP). As is well known in the relevant arts, a NSAP uniquely identifies an edge router at the other end of the SVC. Routing table 360 stores data representing a VPI/VCI to be used associated with each destination IP address. The manner in which IP/NSAP mapping table 335 and routing table 360 may be populated is described below.

Policy tables 330 store policy rules representing the specific IP datagrams requiring buffering when an SVC is being set up. In an embodiment, a policy table is associated with each NSAP. Each policy table may be logically represented as a table, with each row representing a rule, and the columns representing source/destination IP addresses, source/destination ports, IP precedence etc. As may be appreciated, each rule may cover one or more IP flows by appropriate data values. A mask may be associated with each cell (data at the intersection of rows and columns) to enable multiple flows (or to detect specific matches) to be covered by a rule.

Policy tables 330 may further specify the extent of buffering to be provided to each specific application flow. Accordingly, some applications may be provided more buffering and some less, as may be determined to be necessary for individual applications/users. In addition, policy tables 330 may contain a timer value associated with each flow indicating the maximum amount of time the datagrams of the corresponding application flow can be stored in queue 370. As described below, if SVC set up fails, the timer value is used to flush the queue of the corresponding datagrams.

Administrator interface 320 enables a service provider to configure policy tables 330 using a console (not shown) provided with edge router 140-A. However, other types of interfaces may be provided for the service provider's convenience. Administrator interface 320 may also enable an administrator to configure the IP/NSAP mapping table 335 also as represented by line 334.

SVC set up block 350 receives a SVC set up request (from forwarding block 340) along with an NSAP (and IP addresses mapping to the NSAP). As may be appreciated, an NSAP uniquely identifies another edge router (e.g., 140-B). The SVC may be set up in a known way. Once the set up is complete, SVC set up block 350 may store in routing table 360 the VPI/VCI of the set up SVC associated with the IP addresses received in the set up request. In addition, while initiating the SVC set up, SVC set up block 350 may notify flushing block 380 of the initiation. Once the SVC set up is complete, flushing block 380 may be notified of the successful set up.

Queue 370 represents a memory for storing datagrams according to various aspects of the present invention. The memory generally needs to be implemented as a random access memory for high throughput performance, but slower memories (e.g., secondary memories) may be used (in combination with random access memories) for buffering a large number of datagrams. In general, each of queue 370 and tables (330, 335, 360) needs to be implemented using an appropriate memory.

Forwarding block 340 receives IP datagrams from inbound interface 310, and forwards each IP datagram in the form of ATM cells using outbound interface 390. To determine the VPI/VCI value to be used in forwarding a datagram, forwarding block examines the routing table 360. If an entry is found, the datagrams are forwarded to the specified destination using the determined VPI/VCI value. The forwarding may be performed in a known way.

However, if no matching entry is present in routing table 360, forwarding block 340 retrieves the corresponding NSAP entry for the received datagram from the IP/NSAP table 335. Forwarding block 340 forwards the NSAP value (and the IP addresses associated with the NSAP) to SVC set up block 350 to set up an SVC.

Forwarding block 340 examines policy table 330 to determine whether to buffer the datagrams which are to be forwarded on the SVC presently being set up. The buffering policies of each datagram may be determined by the entry (in policy table 330) of the corresponding flow. Thus, the data in policy table 330 determines whether to buffer each datagram, how many datagrams in a flow to buffer, and the amount of time the datagrams need to be buffered. Forwarding block 340 stores the datagrams in queue 370 consistent with the rules stored in policy table 330.

Forwarding block 340 may receive an indication of completion of set up of an SVC from SVC set up block 350. Forwarding block 340 uses the VPI/VCI of the set up SVC to forward the corresponding datagrams stored in queue 370. Once forwarded, the forwarded datagrams may be deleted from queue 370.

Flushing block 380 deletes datagrams from queue 370 upon occurrence or non-occurrence of various conditions. For example, if the set up of a SVC fails, the datagrams buffered for forwarding on the SVC may be deleted. In addition or in the alternative, policy tables 330 may specify a time duration, after which a datagram of a flow is to be deleted from queue 370, and flushing block 380 may be implemented cooperating with forwarding block 340 to cause the datagrams to be deleted after such time duration.

It should be understood that different components of the devices can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing edge router 140-A with a desired mix of hardware, software and/or firmware. An embodiment implemented substantially in software is described below.

5. Software Implementation

Figure 4:
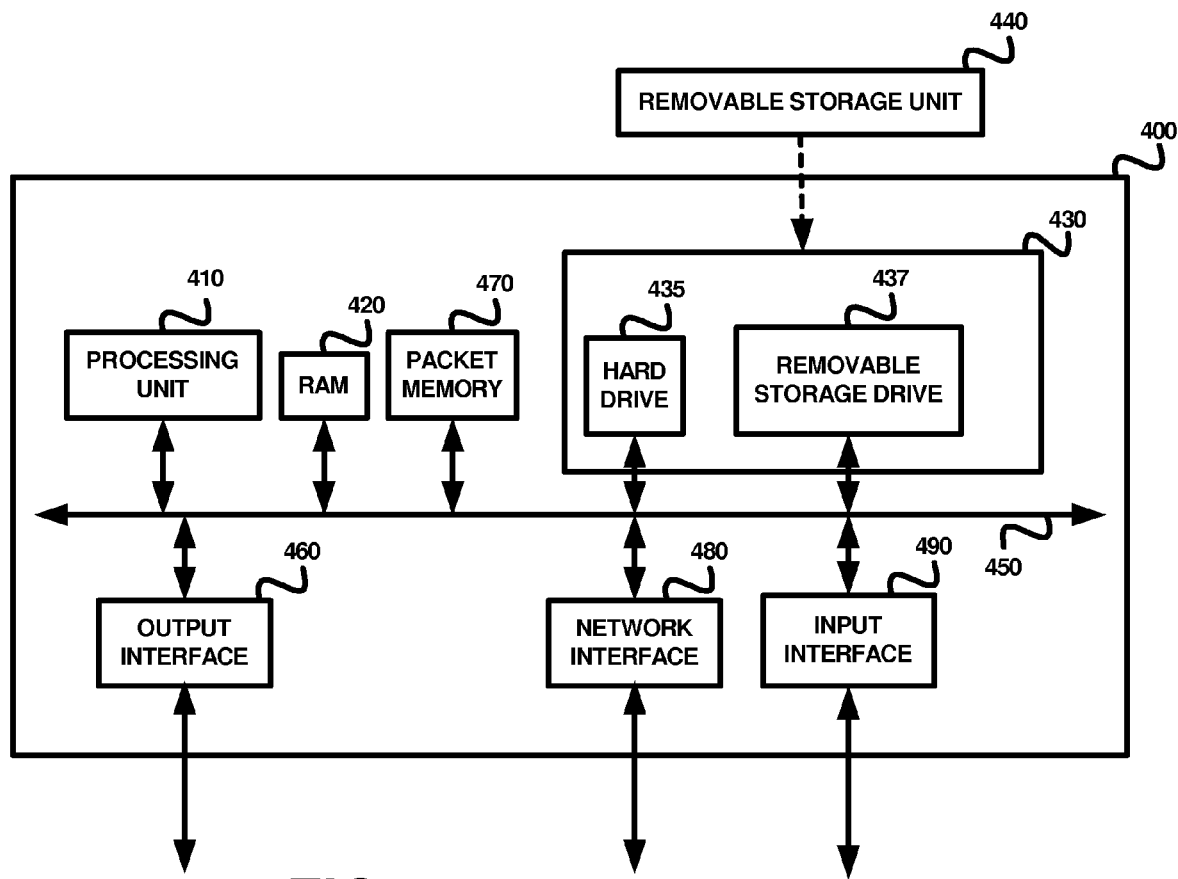
FIG. 4 is a block diagram illustrating the details of implementation of a edge router substantially in the form of software.

FIG. 4 is a block diagram illustrating the details of edge router 140-A in one embodiment. Edge router 140-A is shown containing processing unit 410, random access memory (RAM) 420, storage 430, output interface 460, datagram memory 470, network interface 480 and input interface 490. Each block is described in further detail below.

Output interface 460 provides output signals (e.g., display signals to a display unit, not shown), which can form the basis for a suitable interface for an administrator to interact with edge router 140-A. Input interface 490 (e.g., interface with a key-board and/or mouse, not shown) enables a user/administrator to provide any necessary inputs to edge router 140-A. Output interface 460 and input interface 490 may be used to implement administrator interface 320.

Network interface 480 may enable edge router 140-A to send and receive data on communication networks using ATM and IP. Network interface 480, output interface 460 and input interface 490 may be implemented in a known way.

RAM 420, storage 430, and datagram memory 470 may together be referred to as a memory. RAM 420 receives instructions and data on path 450 from storage 430, and provides the instructions to processing unit 410 for execution. Datagram memory 470 stores (queues) datagrams/cells waiting to be forwarded (or otherwise processed) on different ports.

Secondary memory 430 may contain units such as hard drive 435 and removable storage drive 437. Secondary storage 430 may store the software instructions and data, which enable edge router 140-A to provide several features in accordance with the present invention. While secondary memory 430 is shown contained within edge router 140-A, an alternative embodiment may be implemented with the secondary memory implemented external to edge router 140-A, and the software instructions (described below) may be provided using network interface 480.

Some or all of the data and instructions may be provided on removable storage unit 440 (or from a network using protocols such as Internet Protocol), and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420.

In general, processing unit 410 reads sequences of instructions from various types of memory medium (including RAM 420, storage 430 and removable storage unit 440), and executes the instructions to provide various features of the present invention. Thus, the embodiment(s) of FIG. 4 can be used to avoid data loss according to the specific requirements of different applications as described above.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a user application, said method comprising:

maintaining a policy table containing data representing whether or not to store datagrams related to said user application;

initiating set up of a switched virtual circuit (SVC) such that a destination address specified in an initial datagram can be reached via an edge router;

receiving a plurality of datagrams which are to be forwarded on said SVC, said plurality of datagrams being received from said user application before set up of said SVC is complete;

storing said plurality of datagrams in a buffer of the edge router as the SVC is being set up if said policy table indicates that datagrams related to said user application are to be stored, and wherein the policy table includes a first rule indicating a first level of buffering for a first type of application flow, and a second rule indicating a second level of buffering for a second type of application flow; and forwarding said plurality of datagrams on said SVC once set up of said SVC is complete, wherein said policy table further stores data representing a number of datagrams to be stored for said user application, wherein said storing includes storing said number of datagrams received from said user application.

2. The method of claim 1, wherein each of said plurality of datagrams comprises an Internet Protocol (IP) datagram, and wherein said forwarding sends said IP datagram in the form of a plurality of asynchronous transfer mode (ATM) cells.

3. The method of claim 2, further comprising:

storing in a routing table a VPI/VCI associated with each destination IP address;

receiving a first IP datagram from said user application, said first IP datagram containing a first destination IP address; and performing said initiating if a VPI/VCI is not presently associated with said first destination IP address.

4. The method of claim 3, further comprising:

maintaining an IP to network service access point (NSAP) mapping table, wherein said IP to NSAP mapping table specifies an edge router to which each IP datagram is to be forwarded.

5. The method of claim 4, wherein said policy table stores a timer value associated with said user application, said method further comprising removing said plurality of datagrams from said memory according to said timer value.

6. A computer readable medium carrying one or more sequences of instructions for causing a device to support a user application, wherein execution of said one or more sequences of instructions by one or more processors contained in said device causes said one or more processors to perform the actions of:

maintaining a policy table containing data representing whether or not to store datagrams related to said user application;

initiating set up of a switched virtual circuit (SVC) on a network such that a destination address specified in an initial datagram can be reached via an edge router;

receiving a plurality of datagrams which are to be forwarded on said SVC, said plurality of datagrams being received from said user application before set up of said SVC is complete;

storing said plurality of datagrams in a buffer of the edge router as the SVC is being set up if said policy table indicates that datagrams related to said user application are to be stored, and wherein the policy table includes a first rule indicating a first level of buffering for a first type of application flow, and a second rule indicating a second level of buffering for a second type of application flow; and forwarding said plurality of datagrams on said SVC once set up of said SVC is complete, wherein said policy table further stores data representing a number of datagrams to be stored for said user application, wherein said storing includes storing said number of datagrams received from said user application.

7. The computer readable medium of claim 6, wherein each of said plurality of datagrams comprises an Internet Protocol (IP) datagram, and wherein said forwarding sends said IP datagram in the form of a plurality of asynchronous transfer mode (ATM) cells.

8. The computer readable medium of claim 7, further comprising:

storing in a routing table a VPI/VCI associated with each destination IP address;

receiving a first IP datagram from said user application, said first IP datagram containing a first destination IP address; and performing said initiating if a VPI/VCI is not presently associated with said first destination IP address.

9. The computer readable medium of claim 8, further comprising:

maintaining an IP to network service access point (NSAP) mapping table, wherein said IP to NSAP mapping table specifies an edge router to which each IP datagram is to be forwarded.

10. The computer readable medium of claim 9, wherein said policy table stores a timer value associated with said user application, further comprising removing said plurality of datagrams from said memory according to said timer value.

11. A device in a network supporting a user application, said device comprising:

means for maintaining a policy table containing data representing whether or not to store datagrams related to said user application;

means for initiating set up of a switched virtual circuit (SVC) on said network such that a destination address specified in an initial datagram can be reached via an edge router;

means for receiving a plurality of datagrams which are to be forwarded on said SVC, said plurality of datagrams being received from said user application before set up of said SVC is complete;

means for storing said plurality of datagrams in a buffer of the edge router as the SVC is being set up if said policy table indicates that datagrams related to said user application are to be stored, and wherein the policy table includes a first rule indicating a first level of buffering for a first type of application flow, and a second rule indicating a second level of buffering for a second type of application flow; and means for forwarding said plurality of datagrams on said SVC once set up of said SVC is complete, wherein said policy table further includes data representing a number of datagrams to be stored for said user application, wherein said means for storing includes means for storing said number of datagrams received from said user application.

12. The device of claim 11, wherein each of said plurality of datagrams comprises an Internet Protocol (IP) datagram, and wherein said means for forwarding sends said IP datagram in the form of a plurality of asynchronous transfer mode (ATM) cells.

13. The device of claim 12, further comprising:

means for storing in a routing table a VPI/VCI associated with each destination IP address; and means for receiving a first IP datagram from said user application, said first IP datagram containing a first destination IP address, wherein said means for initiating initiates set up of said VPI/VCI if a VPI/VCI is not presently associated with said first destination IP address.

14. The device of claim 13, further comprising:

means for maintaining an IP to network service access point (NSAP) mapping table, wherein said IP to NSAP mapping table specifies an edge router to which each IP datagram is to be forwarded.

15. The device of claim 14, wherein said policy table stores a timer value associated with said user application, said device further comprising means for removing said plurality of datagrams from said memory according to said timer value.

* * * * *